United States Patent
Brown, deceased

[11] 3,812,209
[45] May 21, 1974

[54] 1-HYDROCARBYLDITHIO-3-ARYL UREAS

[75] Inventor: Melancthon Starr Brown, deceased, late of Berkeley, Calif. by Gustave K. Kohn, administrator

[73] Assignee: Chevron Research Company, San Francisco, Calif.

[22] Filed: Nov. 9, 1970

[21] Appl. No.: 88,106

[52] U.S. Cl...... 260/453 R, 260/544 C, 260/545 R, 71/67, 71/98, 424/298
[51] Int. Cl................................................ C07c 119/00
[58] Field of Search........ 260/453 R, 293.85; 71/98, 71/120

[56] References Cited
UNITED STATES PATENTS

| | | | |
|---|---|---|---|
| 3,121,661 | 2/1964 | Williams | 260/293.85 |
| 2,520,401 | 8/1950 | Himel | 260/293.85 |
| 2,807,615 | 9/1957 | Himel | 260/293.85 |
| 3,539,538 | 11/1970 | Behforouz | 260/780 |
| 3,699,163 | 10/1972 | Kohn | 71/120 |
| 3,344,153 | 9/1967 | Kuhle et al. | 260/453 R |
| 3,276,855 | 10/1966 | Richter | 260/453 R |
| 3,385,692 | 5/1968 | Knowles | 71/120 |
| 2,868,633 | 1/1959 | Goodhue | 71/98 |
| 3,705,923 | 12/1972 | Sullivan | 260/453 R |

Primary Examiner—Glennon H. Hollrah
Attorney, Agent, or Firm—G. F. Magdeburger; John Stoner, Jr.; Raymond Owyang

[57] ABSTRACT

Compounds of the formula

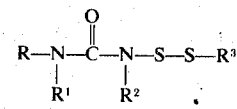

wherein R is phenyl optionally substituted with halogens nitro groups, lower alkyl groups or lower alkoxy groups, $R^1$ and $R^2$ are hydrogen or lower alkyl and $R^3$ is a hydrocarbyl group of 1 to 14 carbon atoms free of aliphatic unsaturation optionally substituted with halogen atoms, nitro groups or alkoxy groups. The compounds are herbicidal.

6 Claims, No Drawings

1-HYDROCARBYLDITHIO-3-ARYL UREAS

FIELD OF THE INVENTION

This invention is directed to novel ureas and their use as herbicides. More particularly, it concerns 1-hydrocarbyldithio-3-aryl ureas and their use as herbicides.

DESCRIPTION OF THE INVENTION

The ureas of this invention may be represented by the formula

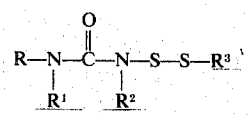

wherein R is phenyl or phenyl substituted with one to four halogen atoms of atomic number 9 to 35 (fluorine, chlorine or bromine), nitro groups, alkyl groups individually of one to four carbon atoms or alkoxy groups individually of one to four carbon atoms; $R^1$ is hydrogen or alkyl of one to four carbon atoms; $R^2$ is hydrogen or alkyl of one to four carbon atoms; and $R^3$ is a hydrocarbyl group of one to 14 carbon atoms, preferably one to 10 carbon atoms, free of aliphatic unsaturation or a hydrocarbyl group of one to 14 carbon atoms free of aliphatic unsaturation substituted with one to four halogen atoms of atomic number 9 to 35 (fluorine, chlorine or bromine), nitro groups or alkoxy groups individually of one to four carbon atoms.

Preferably R is phenyl or phenyl substituted with one to two halogen atoms of atomic number 9 to 35, nitro groups, alkoxy groups individually of one to two carbon atoms or alkyl groups of one to two carbon atoms. The preferred halogen substituents are of atomic number 9 to 17, i.e. fluorine or chlorine. When R is phenyl substituted with alkyl or alkoxy, it is preferred that the alkyl or alkoxy substituents be in position 2, 4 or 6 of the benzene nucleus.

$R^1$ is preferably hydrogen or alkyl of 1 to 2 carbon atoms, more preferably methyl. The preferred $R^1$ group is hydrogen.

$R^2$ is preferably alkyl of 1 to 2 carbon atoms and more preferably methyl.

$R^3$ is as indicated hydrocarbyl, halohydrocarbyl, nitrohydrocarbyl or alkoxyhydrocarbyl free of aliphatic unsaturation. Thus $R^3$ can be alkyl, cycloalkyl, aryl, alkaryl or aralkyl (preferably one to four carbon atoms in the alkyl portion) optionally substituted with halogens, nitro groups or alkoxy groups.

Preferably $R^3$ is alkyl of one to six carbon atoms, alkyl of one to six carbon atoms substituted with one to four halogen atoms of atomic number 9 to 35, nitro groups or alkoxy groups of one to four carbon atoms; phenyl or phenyl substituted with one to four halogen atoms of atomic number 9 to 35, nitro groups, alkyl groups of one to four carbon atoms or alkoxy groups of one to four carbon atoms; benzyl or benzyl substituted on the aromatic moiety with one to four halogen atoms of atomic number 9 to 35, nitro groups, alkyl groups of one to four carbon atoms or alkoxy groups of one to four carbon atoms.

Still more preferably, $R^3$ is alkyl of one to four carbon atoms, phenyl, benzyl or phenyl or benzyl substituted on the aromatic moiety with one to four halogen atoms of atomic number 17 to 35, nitro groups, alkoxy groups of one to four carbon atoms or alkyl groups of one to four carbon atoms. The preferred substituent is alkyl or chlorine.

Representative groups which R may represent include phenyl, o-fluorophenyl, p-fluorophenyl, m-chlorophenyl, o-fluoro-p-bromophenyl, o-methylphenyl, p-ethylphenyl, p-methoxyphenyl, m-butoxyphenyl, p-nitrophenyl, o-nitro-p-methoxyphenyl.

Representation alkyl groups which $R^1$ and $R^2$ may represent include methyl, ethyl, n-propyl, isopropyl, n-butyl and isobutyl.

Representation groups which $R^3$ may represent include methyl, ethyl, n-propyl, isopropyl, n-butyl, isobutyl, pentyl, hexyl, heptyl, octyl, nonyl, decyl, 2-methylbutyl, 3-methyl-pentyl, cyclopentyl, cyclohexyl, cyclooctyl, chloromethyl, 2-chloroethyl, 3-chloropropyl, 4-chloroamyl, 6-chlorohexyl, 2,6-dichlorocyclohexyl, 2,6-dibromocyclohexyl, 3-bromocyclohexyl, bromoethyl, 2-bromoethyl, 3-bromopropyl, phenyl, naphthyl, benzyl, o-fluorophenyl, p-chlorophenyl, m-chlorophenyl, o-bromo-m-chlorophenyl, p-ethylphenyl, p-methoxyphenyl, m-butoxyphenyl, p-nitrophenyl, o-nitro-p-methoxyphenyl, o-chlorobenzyl, tolyl, etc.

Typical ureas of the present invention include 1-methyl-1-phenyldithio-3-o-fluorophenyl urea, 1-methyl-1-benzyldithio-3-o-fluorophenyl urea, 1-methyl-1-methyldithio-3-o-fluorophenyl urea, 1-methyl-1-propyldithio-3-o-fluorophenyl urea, 1-methyl-1-(2-chlorophenyldithio)-3-o-fluorophenyl urea, 1-methyl-1-(2-chloro-4-nitrophenyldithio)-3-o-fluorophenyl urea, 1-methyl-1-(3-methoxyphenyldithio)-3-o-fluorophenyl urea, 1-methyl-1-chloromethyldithio-3-o-fluorophenyl urea, 1-methyl-1-(2-methoxybutyldithio)-3-o-o-fluorophenyl urea, 1-methyl-1-(3-bromophenyldithio)-3-o-chlorophenyl urea, 1-methyl-1-(2-methyl-4-propylphenyldithio)-3-p-chlorophenyl urea, 1-methyl-1-(4-methoxyphenyldithio)-3-m-bromophenyl urea, 1-methyl-1-(4-nitrophenyldithio)-3-o-methylphenyl urea, 1-methyl-1-butyldithio-3-o-methoxyphenyl urea, 1-methyl-1-(2,4-dinitrobenzyldithio)-3-p-propylphenyl urea, 1-methyl-1-(3-chlorophenyldithio)-3-o-fluoro-p-bromophenyl urea, 1-methyl-1-(2,4,6-trichlorophenyldithio)-3-p-ethoxyphenyl urea, 1-methyl-1-(2-butylphenyldithio)-3-m-nitro-p-bromophenyl urea, 1-methyl-1-(2-methyl-4,6-dichlorophenyldithio)-3-o-fluorophenyl urea, 1-methyl-1-(3-bromophenyldithio)-3-phenyl urea, 1-methyl-1-(3-chlorophenyldithio)-3-m-chlorophenyl urea, 1-methyl-1-chloromethyldithio-3-(2-chloro-5-fluorophenyl) urea.

The compounds of the present invention are prepared by reacting a 1-carboxamidothio-3-aryl urea with a mercaptan in accordance with the following equation:

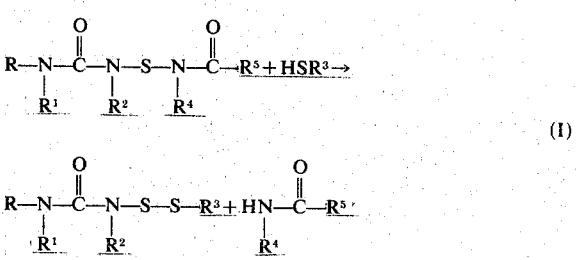

(I)

wherein R, R¹, R² and R³ are as described above and R⁴ is alkyl of one to 10 carbon atoms or cycloalkyl of three to 10 carbon atoms or haloalkyl or halocycloalkyl and R⁵ is hydrogen or R⁴. R⁴ and R⁵ may also be joined to form a linear alkylene radical of three to five carbon atoms which is bound to the carbonyl and nitrogen to form a ring.

The above reaction is accomplished in an inert solvent such as benzene, toluene or chlorinated hydrocarbon at temperature between room temperature and that of the boiling point of the solvent. Autogenous pressure is employed. The reaction will usually be complete in from ¼ to 24 hours, more generally in ½ to 2 hours particularly if an elevated temperature is used. Generally stoichiometric amounts of reactants are used although the mercaptan may be in excess. Generally the volume of solvent will be from 5 to 20 times the volume of mercaptan. Any unreacted mercaptan or other by-product can be removed by aqueous bicarbonate and water washes.

The 1-carboxamidothio-3-aryl urea used in reaction (I) above may be prepared by reacting a urea with an acylamidosulfenyl chloride according to the following equation:

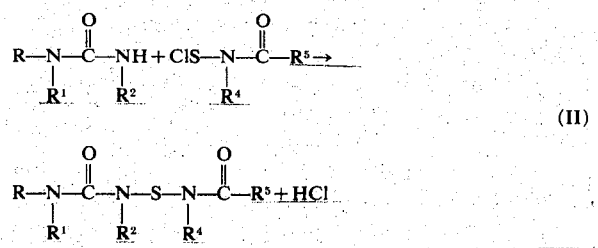

(II)

wherein R, R¹, R², R⁴ and R⁵ are as previously defined. This reaction may be carried out in pyridine, dimethyl formamide with or without an acid acceptor or in other solvents such as methylene chloride, chloroform, acetonitrile and dimethoxyethane using an acid acceptor. Acid acceptors which may be used with dimethyl formamide and these other solvents are pyridine, alkylpyridines, quinoline and similar heterocyclic bases. Pyridine is a preferred acid acceptor. When pyridine is used alone it acts both as a solvent and acid acceptor. The preferred medium for carrying out this reaction is methylene chloride with pyridine as an acid acceptor.

The pressures and temperatures at which the reaction is carried out are not critical. Thus temperatures ranging from ambient to about 60°C. will normally be used. However, lower temperatures or higher temperatures up to the decomposition temperature of the reactants and product may be used. The pressure will generally be atmospheric or autogenous. The reaction will normally be complete within 30 minutes to 4 hours.

The urea reactant in the above equation (II) may be prepared in situ or beforehand. Conventional methods such as reacting an amine with an isocyanate may be used to prepare this reactant.

The acylamido sulfenyl chloride reactant may be prepared by reacting sulfur dichloride with a monoalkylated amide or lactam. This reaction is illustrated by the following equation:

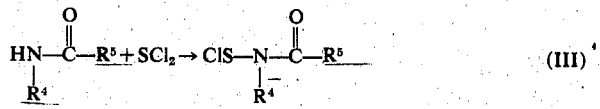

(III)

wherein R⁴ and R⁵ are as previously defined. It is desirable to use stoichiometric proportions of the reactands or an excess of sulfur dichloride reactant up to about 4:1 mole ratio.

The reaction (III) temperature in general is not critical and will usually be in the range of −50° to 100°C., preferably −20° to 60°C. Likewise the pressure is not critical and will usually be atmospheric or autogenous. Reaction time will generally be from ¼ hour to 5 hours.

The reaction (III) will generally be carried out in the presence of an inert solvent such as dichloromethane, diethylether, tetrahydrofuran, dimethylformamide, dioxane, acetonitrile, and the like. Generally each of the reactants will be admixed separately with a solvent and then the mixture containing the amide and preferably a hydrogen halide acceptor will be added slowly with stirring to the mixture containing the sulfur dichloride. The amount of solvent should be equal to or up to five times the weight of the sulfur dichloride. Likewise the solvent for the amide-halide acceptor mixture should be equal to or up to five times the weight of both.

The sulfur dichloride should be added in high purity, for example greater than 98 percent purity. It is frequently desirable to have a small amount of an inhibitor such as tributyl phosphate or triethylphosphate present with the sulfur dichloride in order to maintain the high purity.

The reaction (III) is preferably carried out in the presence of a mild hydrogen halide acceptor. At least stoichiometric amounts of acceptor should be used. Soluble tertiary amines such as pyridine and trialkylamines, e.g., triethylamine and tributylamine are preferred.

The acylamido sulfenyl chloride can generally be recovered from the reaction mixture by stripping any excess sulfur dichloride, filtering off the salt formed between the hydrogen halide acceptor and the HCl, evaporating the solvent and the product purified as by distillation or recrystallization.

EXAMPLES

The following examples illustrate methods used to prepare the ureas of the present invention. These examples are in no way intended to limit the invention described herein. Unless otherwise indicated, percentages are by weight.

Example 1 (Part A) — 1-methyl-1-(N-methylformamidothio)-3-(2-fluorophenyl) urea 12.5 g. of N-methylformamido sulfenyl chloride in 20 ml. of methylene chloride was added slowly to a slurry of 16 g. of 1-methyl-3-(2-fluorophenyl) urea and 9 ml. of pyridine in 150 ml. of methylene chloride with a slight exothermicity. The reaction mixture was stirred one hour at room temperature, washed with water then with aqueous sodium bicarbonate and again with water. After being dried over magnesium sulfate the product solution was stripped of solvent under vacuum and the residual oil was chromatographed on a column of silica gel eluting with ether. A portion of the chromatographed product was recrystallized from benzene-hexane. The product melted at 65°–69°C. and had the following elemental analysis:

| | | Calculated | Found |
|---|---|---|---|
| S | % | 12.45 | 12.92 |
| F | % | 7.40 | 7.64 |

Example 1 (Part B) — 1-methyl-1-(4-chlorophenyldithio)-3-(2-fluorophenyl) urea 5 g. of 1-methyl-1-(N-methylformamidothio)-3-(2-fluorophenyl) urea and 2.8 g. of p-chlorothiophenol were stirred in 50 ml. of benzene at room temperature for 18 hours. The product mixture was washed with water and then with aqueous sodium bicarbonate and then again with water. Following solvent removal under vacuum the crude product was chromatographed on a column of silica gel eluting with ether-hexane. The purified product and oil was analyzed by NMR and infrared spectroscopy and had the following elemental analysis:

|   |   | Calculated | Found |
|---|---|---|---|
| S | % | 18.69 | 18.80 |
| Cl | % | 10.34 | 10.20 |

Example 2 — 1-methyl-1-(n-propyldithio)-3-(2-fluorophenyl) urea 7 g. of 1-methyl-1-(n-methylacetamidothio)-3-(2-fluorophenyl) urea and 2 g. of n-propanethio were combined in 5 ml. of benzene and stirred at reflux conditions for 5 hours. A small amount of unreacted urea starting material was removed by filtration. The solvent was removed from the filtrate under vacuum. The crude product was chromatographed on a column of silica gel eluting with ether-hexane. The purified product and oil was analyzed by NMR and infrared spectroscopy and had the following elemental analysis:

|   |   | Calculated | Found |
|---|---|---|---|
| S | % | 23.20 | 22.91 |
| F | % | 6.95 | 7.10 |

Other ureas included within this invention were prepared using the methods as described above. These compounds are listed in Table I.

inhibit the growth of or kill the seeds, germinating seeds and seedlings. For post-emergence applications the ureas of the present invention will be applied directly to the foliage and othe plant parts. Generally they are effective against weed grasses as well as broad-leaved weeds. Some may be selective with respect to type of application and/or type of weed.

Pre- and post-emergence herbicidal tests on representative ureas of this invention were made using the following methods:

Pre-Emergence Test

An acetone solution of the test ureas was prepared by mixing 750 mg. urea, 220 mg. of a nonionic surfactant and 25 ml. of acetone. This solution was added to approximately 125 ml. of water containing 156 mg. of surfactant.

Seeds of the test vegetation were planted in a pot of soil and the urea solution was sprayed uniformly onto the soil surface at a dose of 100 micrograms per $cm^2$. The pot was watered and placed in a greenhouse. The pot was watered intermittently and was observed for seedling emergence, health of emerging seedlings, etc. for a 3-week period. At the end of this period the herbicidal effectiveness of the urea was rated based on the physiological observations. A 0 to 100 scale was used; 0 representing no phytotoxicity, 100 representing complete kill.

Post-Emergence Test

The test urea was formulated in the same manner as described above for the pre-emergence test. The concentration of the urea in this formulation was 5,000 ppm. This formulation was uniformly sprayed on two replicate pots of 24-day-old plants (approximately 15 to 25 plants per pot) at a dose of 100 micrograms per $cm^2$. After the plants had dried, they were placed in a greenhouse and then watered intermittently at their bases as needed. The plants were observed periodically for phytotoxic effects and physiological and morphological responses to the treatment. After 3 weeks the herbicidal effectiveness of the urea was rated based on these observations. A 0 to 100 scale was used; 0 representing no phytotoxicity, 100 representing complete kill.

The results of these tests appear in Table II.

TABLE I

| Compound | Element analysis | | | | Melting point °C. |
|---|---|---|---|---|---|
|  | S | | Cl | |  |
|  | Calc. | Found | Calc. | Found |  |
| 1-methyl-1-(4-chlorophenyldithio)-3-(4-fluorophenyl) urea | 18.69 | 18.42 | 10.34 | 10.39 | 92–95 |
| 1-methyl-1-(4-chlorobenzyldithio)-3-(2-fluorophenyl urea | 19.00 | 19.02 | 10.49 | 10.52 | Oil |
| 1-methyl-1-(4-chlorophenyldithio)-3-(3,4-dichlorophenyl) urea | 16.30 | 16.19 | 27.02 | 26.15 | 63–68 |
| 1-methyl-1-phenyldithio-3-(2-fluorophenyl) urea | 20.75 | 20.86 | — | — | Oil |
| 1-methyl-1-(4-t-butylphenyldithio)-3-(2-fluorophenyl) urea | 17.60 | 18.08 | — | — | Oil |
| 1-methyl-1-(4-chlorophenyldithio)-3-(4-methoxyphenyl) urea | 18.08 | 17.80 | 9.98 | 10.58 | 90–92 |
| 1-methyl-1-phenyldithio-3-(3,4-dichlorophenyl) urea | 17.85 | 17.61 | 19.52 | 19.20 | 83–85.5 |

UTILITY

The ureas of the present invention are, in general, herbicidal in both pre- and post-emergence applications. For pre-emergence control of undesirable vegetation these ureas will be applied in herbicidal quantities to the enviroment, e.g., soil infested with seeds and/or seedlings of such vegetation. Such application will

TABLE II

| Compound | Herbicidal effectiveness pre/post | | | | | |
|---|---|---|---|---|---|---|
| | O | W | C | M | P | L |
| 1-methyl-1-(4-chlorophenyldithio)-3-(2-fluorophenyl) urea | 100/100 | 100/100 | 100/100 | 100/100 | 100/100 | 100/100 |
| 1-methyl-1-(4-chlorophenyldithio)-3-(4-fluorophenyl) urea | 100/100 | 100/100 | 100/100 | 100/100 | 100/100 | 100/100 |
| 1-methyl-1-(4-chlorobenzyldithio)-3-(2-fluorophenyl) urea | 100/100 | 100/100 | 100/100 | 100/100 | 100/100 | 100/100 |
| 1-methyl-1-(4-chlorophenyldithio)-3-(3,4-dichlorophenyl) urea | 93/100 | 100/100 | 100/100 | 100/100 | 100/100 | 100/100 |
| 1-methyl-1-phenyldithio-3-(2-fluorophenyl) urea | 100/100 | 100/100 | 100/100 | 100/100 | 100/100 | 100/100 |
| 1-methyl-1-(4-t-butylphenyldithio)-3-(2-fluorophenyl) urea | 100/100 | 100/100 | 100/100 | 100/100 | 100/100 | 100/100 |
| 1-methyl-1-(4-chlorophenyldithio)-3-(4-methoxyphenyl) urea | 70/95 | –/100 | 85/100 | 90/100 | 90/100 | 90/100 |
| 1-methyl-1-phenyldithio-3-(3,4-dichlorophenyl) urea | –/100 | 100/100 | 100/100 | 100/100 | 100/100 | 100/90 |
| 1-methyl-1-(n-propyldithio)-3-(2-fluorophenyl) urea | 100/100 | 100/100 | 100/100 | 100/100 | 100/100 | 100/100 |

O = Wild Oats (*Avena fatua*).
W = Watergrass (*Echinochloa crusgalli*).
C = Crabgrass (*Digitaria sanguinalis*).
M = Mustard (*Brassica arvensis*).
P = Pigweed (*Amaranthus retroflexus*).
L = Lambsquarter (*Chenopodium album*).

The amount of urea administered will vary with the particular plant part or plant growth medium which is to be contacted, the general location of application, i.e., sheltered areas such as greenhouses as compared to exposed areas such as fields, as well as the desired type of control. For pre-emergent control of most plants dosages in the range of about 0.5 to 20 lbs. per acre will be used. Such administration will give a concentration of about 2 to 80 ppm. urea distributed throughout 0.1 acre-foot. For post-emergence application, such as foliar spray application, compositions containing about 0.5 to 8 lbs. urea per 100 gal. spray will be used. Such application is equivalent to about 0.5 to 20 lbs. urea per acre.

The herbicidal compositions of this invention comprise a herbicidal amount of one or more of the above described ureas intimately admixed with a biologically inert carrier. The carrier may be a liquid diluent such as water or acetone or a solid. The solid may be in the form of dust powder or granules. These compositions will also usually contain adjuvants such as a wetting or dispersing agent to facilitate their penetration into the plant growth media or plant tissue and generally enhance their effectiveness. These compositions may also contain other pesticides, stabilizers, conditioners, fillers and the like.

Some of the compounds of the present invention also exhibit algicidal activity as well as fungicidal activity.

As will be evident to those skilled in the art, various modifications on this invention can be made or followed, in the light of the foregoing disclosure and discussion, without departing from the spirit or scope of the disclosure or from the scope of the following claims.

What is claimed is:

1. A method for preparing compounds of the formula

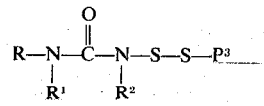

wherein R is phenyl or phenyl substituted with one to two halogens of atomic number 9 to 35, nitro, alkoxy of one to two carbon atoms, or alkyl of one to two carbon atoms, $R^1$ is hydrogen or alkyl of one to four carbon atoms, $R^2$ is alkyl of one to four carbon atoms; and $R^3$ is alkyl of one to six carbon atoms, phenyl, phenyl substituted with one to two halogens of atomic number 9 to 35, nitro, alkyl of one to four carbon atoms or alkoxy of one to four carbon atoms, benzyl, or benzyl substituted on the aromatic ring with one to two halogens of atomic number 9 to 35, nitro, alkyl of one to four carbon atoms or alkoxy of 1 to 4 carbon atoms, which comprises reacting a 1-carboxamidothio-3-aryl urea of the formula

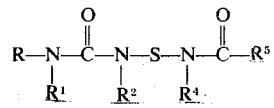

with a mercaptan of the formula $HSR^3$, wherein R, $R^1$, $R^2$ and $R^3$ are as defined above, $R^4$ is alkyl of 1 to 10 carbon atoms, and $R^5$ is hydrogen or $R^4$, in an inert solvent at a temperature between room temperature and the boiling point of the solvent.

2. The process of claim 1, wherein $R^1$ is hydrogen and $R^2$ is alkyl of one to two carbon atoms.

3. The process of claim 2 wherein R is phenyl substituted with one to two fluorine or chlorine atoms.

4. The process of claim 3 wherein $R^3$ is alkyl of one to four carbon atoms or phenyl.

5. The process of claim 4 wherein R is 2-fluorophenyl.

6. The process of claim 4 wherein R is 3,4-dichlorophenyl.

* * * * *